(12) United States Patent
Cheng et al.

(10) Patent No.: US 11,405,533 B2
(45) Date of Patent: Aug. 2, 2022

(54) IMAGE CAPTURING APPARATUS

(71) Applicants: Chen-Hsien Cheng, Taipei (TW);
Li-Fang Chen, Taipei (TW);
Ruei-Hong Hong, Taipei (TW)

(72) Inventors: Chen-Hsien Cheng, Taipei (TW);
Li-Fang Chen, Taipei (TW);
Ruei-Hong Hong, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/940,402

(22) Filed: Jul. 28, 2020

(65) Prior Publication Data

US 2021/0144277 A1 May 13, 2021

Related U.S. Application Data

(60) Provisional application No. 62/932,420, filed on Nov. 7, 2019.

(51) Int. Cl.
| | |
|---|---|
| *H04N 5/225* | (2006.01) |
| *G03B 17/02* | (2021.01) |
| *G03B 17/55* | (2021.01) |
| *H04R 1/02* | (2006.01) |
| *H04N 7/18* | (2006.01) |
| *A63H 3/36* | (2006.01) |

(52) U.S. Cl.
CPC .......... *H04N 5/2252* (2013.01); *G03B 17/02* (2013.01); *G03B 17/55* (2013.01); *H04N 5/2254* (2013.01); *H04N 5/22521* (2018.08); *H04R 1/028* (2013.01); *H04R 2499/11* (2013.01)

(58) Field of Classification Search
CPC .................................................... H04N 5/2252
USPC ......................................................... 348/374
See application file for complete search history.

(56) References Cited

U.S. PATENT DOCUMENTS

2015/0381859 A1* 12/2015 Cover .................. H04W 84/12
348/374

FOREIGN PATENT DOCUMENTS

| CN | 200983031 | 11/2007 |
|---|---|---|
| TW | M583997 | 9/2019 |

OTHER PUBLICATIONS

Office Action of Taiwan Counterpart Application, dated Jun. 29, 2021, pp. 1-6.

* cited by examiner

*Primary Examiner* — Sinh Tran
(74) *Attorney, Agent, or Firm* — JCIPRNET (57) ABSTRACT

An image capturing apparatus includes a main frame and a lens module, a middle pillar, a module board, a first housing, and a second housing assembled to the main frame respectively. The main frame has a side wall, and the first housing covers the module board. The first housing, the module board, and the middle pillar are located on a same longitudinal axis of the main frame. The first housing and the module board are opposite to the middle pillar with the main frame interposed therebetween. The module board is located between the first housing and the main frame, and the lens module is located on a horizontal axis of the main frame. The first housing and the second housing encapsulate the main frame, and the side wall leans against the first housing and the second housing.

13 Claims, 6 Drawing Sheets

IMAGE CAPTURING APPARATUS

CROSS-REFERENCE TO RELATED APPLICATION

This application claims the priority benefit of U.S. provisional application Ser. No. 62/932,420, filed on Nov. 7, 2019. The entirety of the above-mentioned patent application is hereby incorporated by reference herein and made a part of this specification.

BACKGROUND

Technical Field

The disclosure relates to an image capturing apparatus.

Description of Related Art

With the advancement of technology, the telehealth care system has become one of the essential technologies for caring for infants or seniors at home. In such a system, an image capturing apparatus is used to transmit an image of a care recipient to the remote caregiver. In this way, the caregiver may receive the real-time image of the care recipient to know the current situation of the care recipient, and that the caregiver may perform recording or provide corresponding caring activities. Further, the caregiver may interact with the care recipient through the audio and video functions provided by the image capturing apparatus.

In addition to the aforementioned basic functions, the image capturing apparatuses designed for infants and kids may also function as a toy, so as to attract the attention of infants and kids through the audio and video effects. Nevertheless, problems related to usage of the image capturing apparatuses may occur when the apparatuses are used in this way. In the existing art, a product satisfying all the above-mentioned requirements is not currently available. In particular, besides the abovementioned basic functions, structural strength and durability as well as safety for infants and kids are also important characteristics of an image capturing apparatus.

SUMMARY

The disclosure provides an image capturing apparatus exhibiting a toughness characteristic through a characteristic featuring single main frame assembly.

An image capturing apparatus provided by the disclosure includes a main frame and a lens module, a middle pillar, a module board, a first housing, and a second housing assembled to the main frame respectively. The main frame has a side wall, and the first housing covers the module board. The first housing, the module board, and the middle pillar are located on a same longitudinal axis of the main frame. The first housing and the module board are opposite to the middle pillar with the main frame interposed therebetween. The module board is located between the first housing and the main frame, and the lens module is located on a horizontal axis of the main frame. The first housing and the second housing encapsulate the main frame, and the side wall leans against the first housing and the second housing.

In an embodiment of the disclosure, the second housing has an opening, and the middle pillar penetrates the opening and is assembled to the main frame.

In an embodiment of the disclosure, the side wall crosses a seam between the first housing and the second housing.

In an embodiment of the disclosure, the side wall has a plurality of protruding ribs disposed on an arc-shaped inner wall of the side wall and parallel to the longitudinal axis.

In an embodiment of the disclosure, the side wall has a plurality of battlements surrounding the module board, and the lens module is assembled to one of the battlements.

In an embodiment of the disclosure, the side wall has the plurality of protruding ribs disposed on at least one battlement not on the horizontal axis.

In an embodiment of the disclosure, the second housing has a gap exposing one of the battlements, and the lens module is assembled to the exposed battlement and fills the gap.

In an embodiment of the disclosure, the main frame has an inner bottom, the battlements extend in an arc shape from a plurality of side edges of the inner bottom, and the middle pillar and the module board are assembled at two opposite sides of the inner bottom.

In an embodiment of the disclosure, the module board includes a first circuit board and a first heat dissipation board, and the first heat dissipation board is configured to dissipate heat from the first circuit board. The lens module includes a second circuit board and a second heat dissipation board, and the second heat dissipation board is configured to dissipate heat from the second circuit board. Each of the first housing and the second housing has a plurality of opening holes to communicate an internal space between the first housing and the second housing with an external environment, so that heat energy of the first heat dissipation board and the second heat dissipation board is dissipated to the external environment through the opening holes.

In an embodiment of the disclosure, the image capturing apparatus further includes a speaker module disposed between the first housing and the second housing, and voice generated by the speaker module is transmitted to the external environment through the opening holes.

In an embodiment of the disclosure, the speaker module is assembled to the first housing along the longitudinal axis and is located between the first housing and the module board, and the speaker module and the lens module are located on the horizontal axis.

In an embodiment of the disclosure, each of the first housing and the second housing has a rigid structure and a buffering layer covering the rigid structure.

In an embodiment of the disclosure, the image capturing apparatus further includes a base assembled to the middle pillar and opposite to the main frame, and the base is located on the longitudinal axis.

To sum up, the image capturing apparatus exhibits the characteristic featuring single main frame assembly. That is, the main frame acts as the structure core, and the rest of the members (the lens module, the middle pillar, the module board, the first housing, and the second housing) are directly assembled to the main frame to be combined with the main frame without the use of an intermediary member. In this way, the assembly strength is concentrated on the main frame, dispersion of the center of gravity of the apparatus as a whole is prevented from occurring, and the image capturing apparatus may thereby exhibit a toughness characteristic. In this way, besides the basic functions such as the telehealth care function, the image capturing apparatus may also provide a toy function for infants and kids with enhanced durability.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
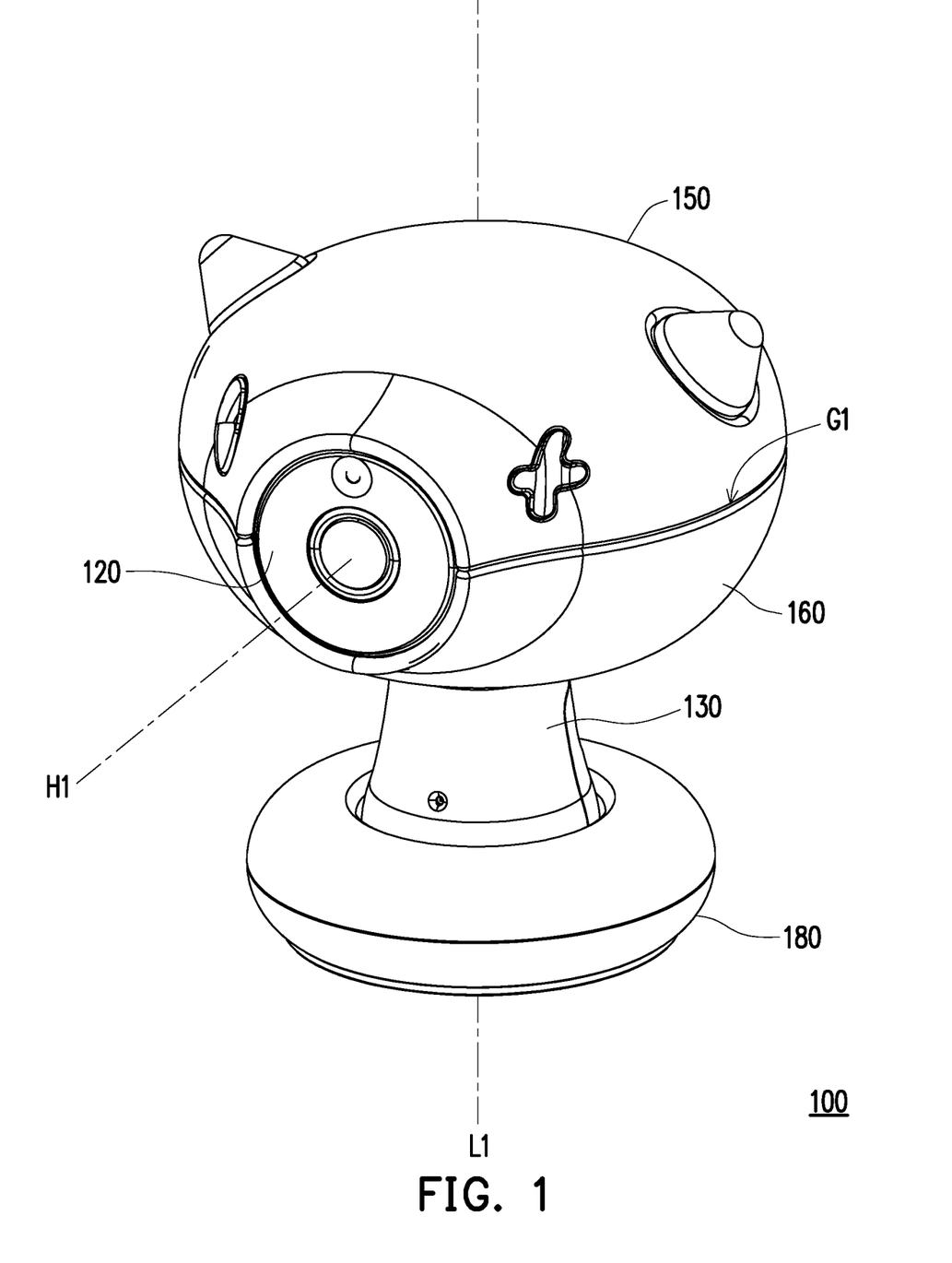
FIG. 1 is a schematic view of an image capturing apparatus according to an embodiment of the disclosure.
Figure 2A:
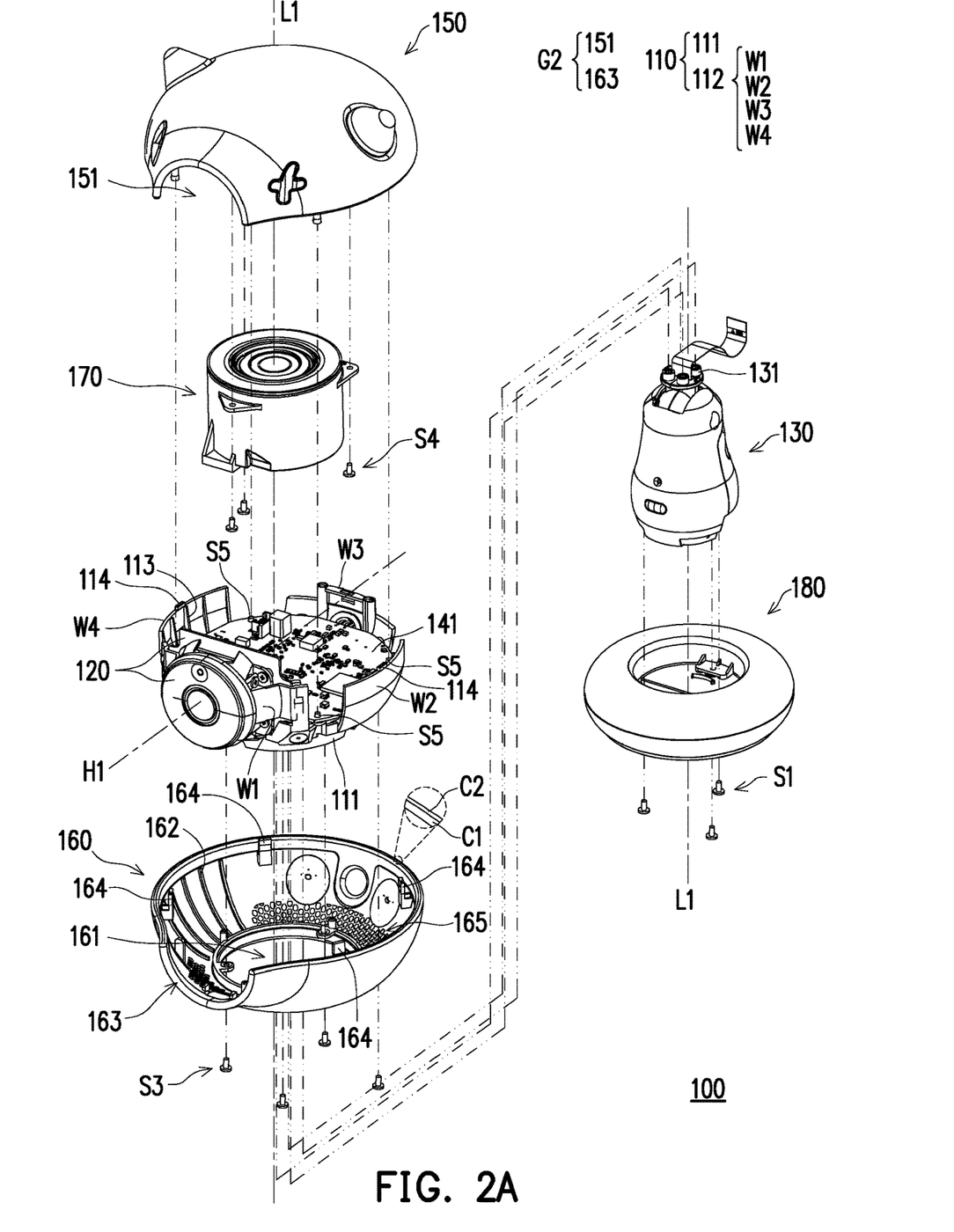
FIG. 2A and FIG. 2B are exploded views of the image capturing apparatus of FIG. 1 at different levels.
Figure 2B:
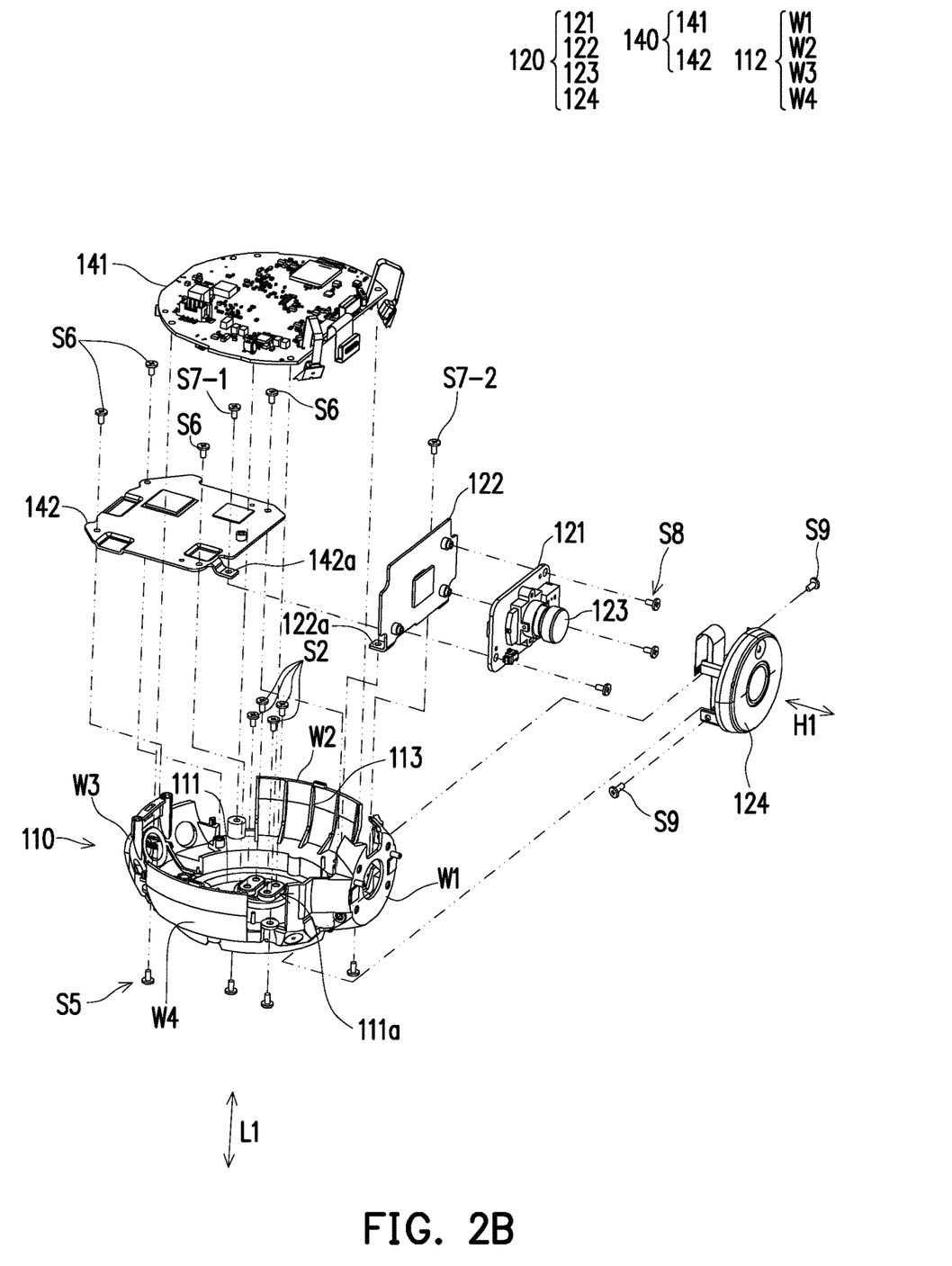
Figure 2C:
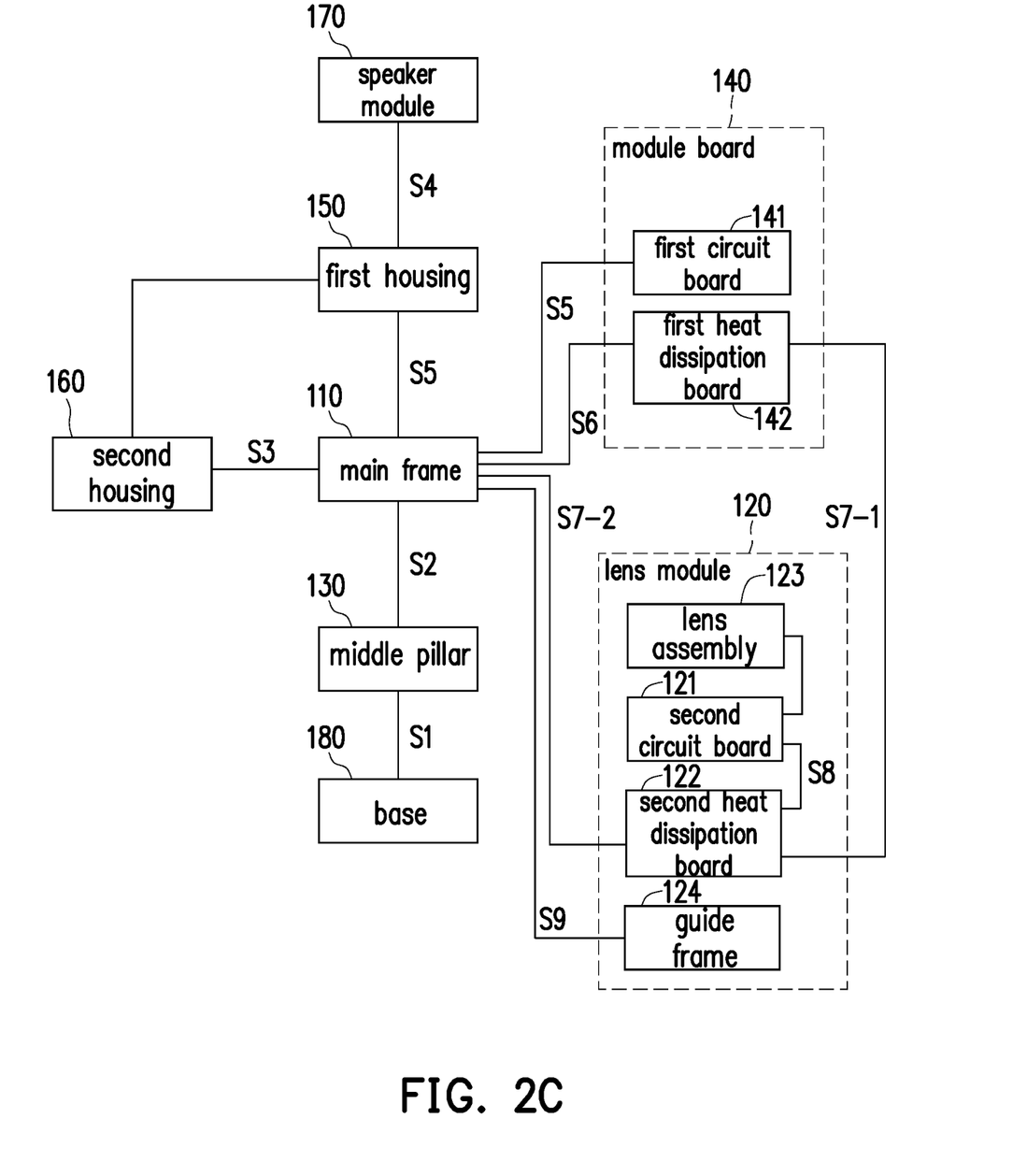
FIG. 2C is a view of assembly relationships among members of the image capturing apparatus of FIG. 1.

FIG. 1 is a schematic view of an image capturing apparatus according to an embodiment of the disclosure. FIG. 2A and FIG. 2B are exploded views of the image capturing apparatus of FIG. 1 at different levels. FIG. 2C is a view of assembly relationships among members of the image capturing apparatus of FIG. 1. Referring to FIG. 1, FIG. 2A, and FIG. 2C first, in this embodiment, an image capturing apparatus 100 includes a main frame 110, a base 180, a speaker module 170, and a lens module 120, a middle pillar 130, a module board 140, a first housing 150 and a second housing 160 respectively assembled to the main frame 110. The main frame 110 has a side wall 112, and the first housing 150 covers the module board 140. The first housing 150, the module board 140, and the middle pillar 130 are located on a same longitudinal axis L1 of the main frame 110. The first housing 150 and the module board 140 are opposite to the middle pillar 130 with the main frame 110 interposed therebetween. The module board 140 is located between the first housing 150 and the main frame 110, and the lens module 120 is located on a horizontal axis H1 of the main frame 110. The first housing 150 and the second housing 160 encapsulate the main frame 110, and the side wall 112 leans against the first housing 150 and the second housing 160. The speaker module 170 is assembled on an inner surface of the first housing 150 and is located on the longitudinal axis L1, and the base 180 is assembled to the middle pillar 130 along the longitudinal axis L1 and is opposite to the main frame 110. The speaker module 170 is located between the first housing 150 and the module board 140 along the longitudinal axis L1, and the speaker module 170 and the lens module 120 are located on the horizontal axis H1.

In other words, in the image capturing apparatus 100 provided by this embodiment, according to the assembly relationship as shown in FIG. 2C, except the speaker module 170 and the base 180, the rest of the members are directly assembled to the main frame 110, that is, an intermediary member is not required to allow these members to be assembled to the main frame 110. In this way, the main frame 110 acting as a single main structure is just like the trunk of a tree, and each of the branches (the rest of the members except the speaker module 170 and the base 180) may be treated as extension (i.e., a non-secondary branch structure) from the trunk. In this way, sufficient combination strength is provided, so that an overall center of gravity of the image capturing apparatus 100 may be concentrated. As for the speaker module 170 and the base 180, since the two members are still located on the longitudinal axis L1, the centers of gravity of the two are substantially consistent with that of the main frame 110. As such, when the image capturing apparatus 100 stands on a platform (not shown) as shown in FIG. 1, dispersion of the centers of gravity may not occur. Accordingly, overall assembly strength concentrates on the main frame 110, and moreover, since the centers of gravity are consistently configured, the image capturing apparatus 100 may exhibit toughness, and durability of the apparatus may thus be effectively enhanced.

Referring to FIG. 2A to FIG. 2C together, the assembly relationships among members are described as follows. In this embodiment, lock attachment members S1 to S9 are used herein to demonstrate member assembly and combination, but the disclosure is not limited thereto. In this embodiment, the main frame 110 further includes an inner bottom 111, and the side wall 112 extends upwards in an arc shape from a plurality of side edges of the inner bottom 111. As shown in FIG. 2B, the side wall 112 includes a plurality of battlements W1 to W4 surrounding the inner bottom 111. The module board 140 includes a first circuit board 141 and a first heat dissipation board 142. The first circuit board 141 is assembled to the inner bottom 111 of the main frame 110 through the lock attachment member S5, and the first heat dissipation board 142 is assembled to the inner bottom 111 of the main frame 110 through the lock attachment member S6. Moreover, the first heat dissipation board 142 is located between the inner bottom 111 and the first circuit board 141, and the module board 140 is configured to be surrounded by the battlements W1 to W4. The first heat dissipation board 142 thermally contacts the first circuit board 141 to dissipate heat from the first circuit board 141. The means used for thermal contact is not particularly limited and may be implemented through a thermal pad or a thermally conductive adhesive.

Further, the lens module 120 includes a second circuit board 121, a second heat dissipation board 122, a lens assembly 123, and a guide frame 124. The lens assembly 123 is assembled to the second circuit board 121, and the second circuit board 121 is assembled to the second heat dissipation board 122 through the lock attachment member S8. The second heat dissipation board 122 is assembled to the inner bottom 111 of the main frame 110 through the lock attachment members S7-1 and S7-2. Herein, the second circuit board 121, the second heat dissipation board 122, and the lens assembly 123 are assembled at an inner side of the battlement W1, and the guide frame 124 is assembled at an outer side of the battlement W1 through the lock attachment member S9. The lens assembly 123 penetrates an opening of the battlement W1. Moreover, the guide frame 124, the lens assembly 123, the battlement W1, the second circuit board 121, and the second heat dissipation board 122 are substantially arranged in sequence along the horizontal axis H1. The second heat dissipation board 122 is configured to dissipate heat from the second circuit board 121, and the heat dissipation technique used between the first circuit board 141 and the first heat dissipation board 142 may be adopted herein.

Referring to FIG. 2B and FIG. 2C again, note that in this embodiment, an extending portion 142a and an extending portion 122a respectively extending from the first heat dissipation board 142 and the second heat dissipation board 122 are further assembled together through the lock attachment member S7-1, so that the first heat dissipation board 142 and the second heat dissipation board 122 are thermally conducted to each other. A thermal capacity of each of the first heat dissipation board 142 and the second heat dissipation board 122 is thus expanded since the thermal capacity is no longer limited to that of the single first heat dissipation board 142 or the single second heat dissipation board 122, and a heat dissipation effect is thereby enhanced thanks to the shared heat dissipation board structure.

With reference to FIG. 2A to FOG. 2C again, the base 180 is assembled to a bottom of the middle pillar 130 through the lock attachment member S1. The middle pillar 130 also includes a lock attachment platform 131 (being formed by a plurality of lock attachment pillars, for example) located at a top thereof, and after penetrating an opening 161 of the second housing 160, the lock attachment platform 131 and a lock attachment platform 111a of the inner bottom 111 of the main frame 110 are assembled together through the lock attachment member S2 (shown in FIG. 2B). Herein, the lock attachment platform 111a forms a recess on a bottom surface of the inner bottom 111 to accordingly accommodate the protruding lock attachment platform 131. Besides, the lock attachment member S5 is configured to combine the first circuit board 141 and the main frame 110 together, and further, as shown in FIG. 2A, the lock attachment member S5 is further locked to the first housing 150, so that concentration of the assembly strength is further enhanced.

Figure 3:
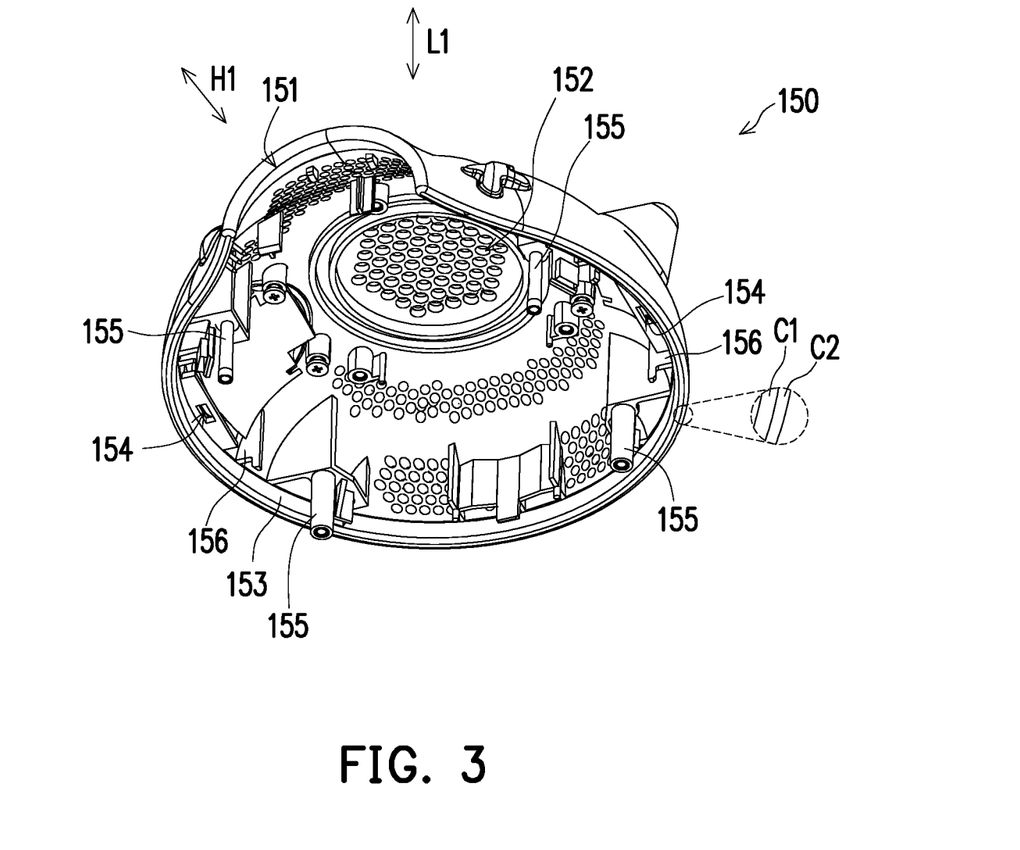
FIG. 3 depicts a first housing of the image capturing apparatus of FIG. 1 from another viewing angle.

FIG. 3 depicts the first housing of the image capturing apparatus of FIG. 1 from another viewing angle. With reference to FIG. 2A, FIG. 2C, and FIG. 3 together, the speaker module 170 is assembled to an inner side of the first housing 150 through the lock attachment member S4. The second housing 160 is assembled to the inner bottom 111 of the main frame 110 through the lock attachment member S3. The first housing 150 has an inner flange 153, the second housing 160 has hooks 164, and the hooks 164 may be accordingly engaged with the inner flange 153 so that the first housing 150 and the second housing 160 are assembled. In the assembly process, protruding portions 114 of the main frame 110 may further be guided and bonded to opening holes 154 of the first housing 150. Note that the lock attachment member S5 configured to be assembled to the first housing 150 is substantially locked to a plurality of protruding pillars 155 at the inner side of the first housing 150.

With reference to FIG. 2A and FIG. 3, in this embodiment, each of the first housing 150 and the second housing 160 has a plurality of opening holes 152 and 165 to communicate an internal space between the first housing 150 and the second housing 160 after being assembled with an external environment, so that heat energy of the first heat dissipation board 142 and the second heat dissipation board 122 is dissipated to the external environment through the opening holes 152 and 165. Moreover, voice generated by the speaker module 170 is transmitted to the external environment through these opening holes 152 and 165. Besides, each of the first housing 150 and the second housing 160 has a rigid structure C1 and a buffering layer C2 covering the rigid structure C1. Herein, the opening holes 152 and 165 are located in the rigid structures C1, and the buffering layers C2 may thus shield these opening holes 152 and 165, and a favorable appearance is thereby provided. The image capturing apparatus 100 may also function as a toy, but through the arrangement of the buffering layers C2, enhanced safety is provided to infants and kids, and the apparatus as a whole is provided with a buffering effect so as to exhibit drop resistance or collision resistance. In this embodiment, fabric corresponding to the speaker characteristics of the speaker module 170 may be selected for the buffering layers C2, so that voice generated by the speaker module 170 may be smoothly transmitted out of the image capturing apparatus 100, or an acoustic frequency of the speaker module 170 may be adjusted to provide a favorable listening experience. In an embodiment that is not shown, a rubber material or a silicone rubber material may also be selected for the buffering layers C2, so that a protection effect is provided, and a user may enjoy a comfortable using experience.

Figure 4:
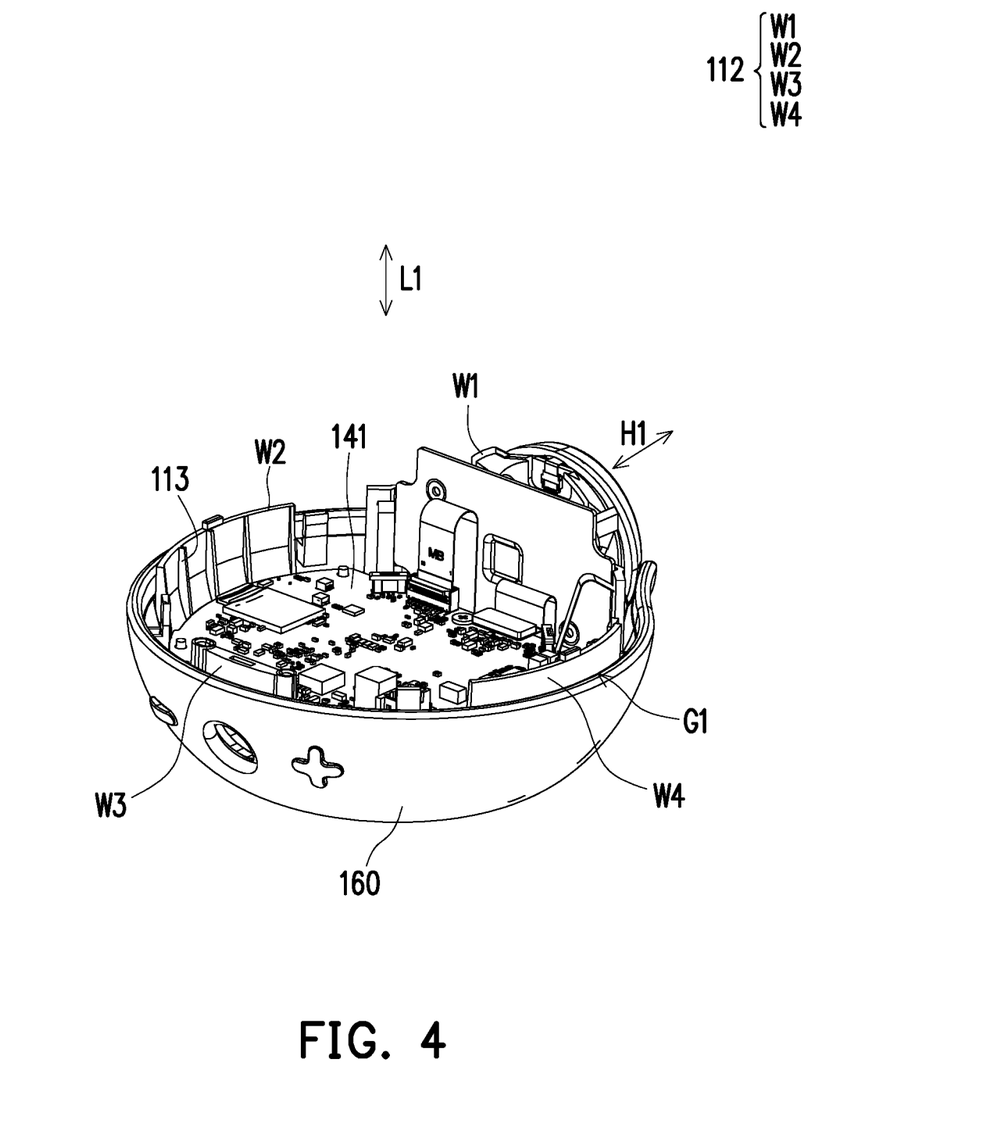
FIG. 4 is a schematic view of assembly of part of members of the image capturing apparatus of FIG. 1.

As shown in FIG. 2A, a notch 151 of the first housing 150 and a notch 163 of the second housing 160 form a gap G2 after being assembled. One battlement W1 of the main frame 110 is exposed from the gap G2, and the lens module 120 is assembled to the exposed battlement W1 and fills the gap G2. Further, FIG. 4 is a schematic view of assembly of part of members of the image capturing apparatus of FIG. 1. With reference to FIG. 2A, FIG. 3, and FIG. 4 together, regarding the main frame 110, the side wall 112 has a plurality of protruding ribs 113 located on arc-shaped inner walls of the battlements W2 and W4 and substantially parallel to the longitudinal axis L1 in an extending direction. Herein, since assembly of the first housing 150 and the second housing 160 is completed through engagement of the hooks 164 with the inner flange 153, the protruding ribs 113 located on the battlements W2 and W4 may be configured to resist an external force squeezing the first housing 150 and the second housing 160, and internal members are thus prevented from being damaged or deformed. Similarly, since the first housing 150 and the second housing 160 respectively include protruding ribs 156 and 162 corresponding to the protruding ribs 113 of the main frame 110, when assembly is performed, the first housing 150 and the second housing 160 may leans against an outer side of the main frame 110 as well through the protruding ribs 156 and 162. In other embodiments that are not shown, the protruding ribs may be disposed on other battlements as well, and the same resistance to deformation as described above is also provided.

With reference to FIG. 1, FIG. 2A, and FIG. 4, in this embodiment, after the first housing 150 and the second housing 160 are assembled to the main frame 110, the side wall 112 leaning against the first housing 150 and the second housing 160 is substantially crosses a seam G1 between the first housing 150 and the second housing 160. In this way, as shown in FIG. 4, a stacked leaning effect is generated among the first housing 150, the second housing 160, and the main frame 110. The first housing 150 and the second housing 160 accordingly lean on the same battlement among the battlements W1 to W4, so that assembly strength is enhanced, and moreover, together with the arrangement of the protruding ribs 113, 156, or 162, resistance to deformation is improved.

In view of the foregoing, in the embodiments of the disclosure, the image capturing apparatus exhibits the characteristic featuring single main frame assembly. That is, the main frame acts as the structure core, and the rest of the members (the lens module, the middle pillar, the module board, the first housing, and the second housing) are directly assembled to the main frame to be combined with the main frame without the use of an intermediary member. In this way, the assembly strength is concentrated on the main frame, dispersion of the center of gravity of the apparatus as a whole is prevented from occurring, and the image capturing apparatus may thereby exhibit a toughness characteristic. Regarding the speaker module and the base that are not directly assembled to the main frame, the speaker module and the base are arranged to be located on the longitudinal axis of the main frame. In other words, the first housing, the speaker module, the module board, the main frame, the middle pillar, and the base are all located on the longitudinal axis and the centers of gravity thereof are consistent, so that the assembly strength of the structure may be concentrated.

Further, the first housing and the second housing acting as external members not only exhibit enhanced structural strength through the rigid structures, but also are provided with buffering layers outside the rigid structures. Therefore, the image capturing apparatus may also provide enhanced safety for infants and kids in addition to providing a toy function, and since the apparatus as a whole is provided with a buffering effect through the arrangement of the buffering layers, drop resistance or collision resistance is improved.

In this way, besides the basic function such as the telehealth care function, the image capturing apparatus may act as a toy and provides necessary safety and durability for infants and kids.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image capturing apparatus, comprising:
a main frame, having a side wall;
a lens module, assembled to the main frame;
a middle pillar, assembled to the main frame;
a module board, assembled to the main frame;
a first housing, assembled to the main frame and covering the module board, wherein the first housing, the module board, and the middle pillar are located on a same longitudinal axis of the main frame, the first housing and the module board are opposite to the middle pillar with the main frame interposed therebetween, the module board is located between the first housing and the main frame, and the lens module is located on a horizontal axis of the main frame; and
a second housing, assembled to the main frame, wherein the first housing and the second housing encapsulate the main frame, and the side wall leans against the first housing and the second housing,
wherein each of the first housing and the second housing has a rigid structure and a buffering layer covering the rigid structure.

2. The image capturing apparatus according to claim 1, wherein the second housing has an opening, and the middle pillar penetrates the opening and is assembled to the main frame.

3. The image capturing apparatus according to claim 1, wherein the side wall crosses a seam between the first housing and the second housing.

4. The image capturing apparatus according to claim 1, wherein the side wall has a plurality of protruding ribs disposed on an arc-shaped inner wall of the side wall and parallel to the longitudinal axis.

5. The image capturing apparatus according to claim 4, wherein the side wall has a plurality of battlements surrounding the module board, and the lens module is assembled to one of the battlements.

6. The image capturing apparatus according to claim 5, wherein the side wall has the plurality of protruding ribs disposed on at least one battlement.

7. The image capturing apparatus according to claim 5, wherein the first housing and the second housing form a gap exposing one of the battlements, and the lens module is assembled to the exposed battlement and fills the gap.

8. The image capturing apparatus according to claim 5, wherein the main frame has an inner bottom, the battlements extend in an arc shape from a plurality of side edges of the inner bottom, and the middle pillar and the module board are assembled at two opposite sides of the inner bottom.

9. The image capturing apparatus according to claim 1, wherein the module board comprises a first circuit board and a first heat dissipation board, the first heat dissipation board is configured to dissipate heat from the first circuit board, the lens module comprises a second circuit board and a second heat dissipation board, the second heat dissipation board is configured to dissipate heat from the second circuit board, and each of the first housing and the second housing has a plurality of opening holes to communicate an internal space between the first housing and the second housing with an external environment, so that heat energy of the first heat dissipation board and the second heat dissipation board is dissipated to the external environment through the opening holes.

10. The image capturing apparatus according to claim 9, wherein the first heat dissipation board and the second heat dissipation board are thermally conducted to each other.

11. The image capturing apparatus according to claim 9, further comprising:
a speaker module, disposed between the first housing and the second housing, wherein voice generated by the speaker module is transmitted to the external environment through the opening holes.

12. The image capturing apparatus according to claim 11, wherein the speaker module is assembled to the first housing along the longitudinal axis and is located between the first housing and the module board, and the speaker module and the lens module are located on the horizontal axis.

13. The image capturing apparatus according to claim 1, further comprising:
a base, assembled to the middle pillar and opposite to the main frame, wherein the base is located on the longitudinal axis.

* * * * *